United States Patent [19]

Muller et al.

[11] 4,416,950
[45] Nov. 22, 1983

[54] TRANSPARENT FIBROUS SHEETS

[75] Inventors: Peter Muller; Henry Mustacchi, both of Port Washington; Leonard Kreicas, Syosset, all of N.Y.

[73] Assignee: Andrews Paper & Chemical Co., Port Washington, N.Y.

[21] Appl. No.: 372,953

[22] Filed: Apr. 29, 1982

[51] Int. Cl.³ .............................................. B32B 23/10
[52] U.S. Cl. .................................... 428/537; 428/264; 428/513; 428/514; 428/522; 430/181; 526/282; 162/168.1; 162/168.7
[58] Field of Search ............... 428/537, 264, 513, 514, 428/522; 430/181, 148, 183, 159; 526/282; 162/168.1, 168.7

[56] References Cited

U.S. PATENT DOCUMENTS

| | | | |
|---|---|---|---|
| 3,235,443 | 2/1966 | Greenman et al. | 162/168.1 |
| 4,271,227 | 6/1981 | Muller et al. | 162/168.1 |
| 4,304,626 | 12/1981 | Shaw et al. | 162/168.1 |
| 4,319,009 | 3/1982 | Friedli et al. | 526/282 |
| 4,362,848 | 12/1982 | Friedli et al. | 526/282 |

*Primary Examiner*—George F. Lesmes
*Assistant Examiner*—E. Rollins Buffalow
*Attorney, Agent, or Firm*—Kane, Dalsimer, Kane, Sullivan & Kurucz

[57] ABSTRACT

Fibrous sheets are transparentized by coating them with monomers of the formula:

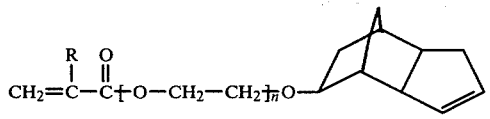

wherein R is hydrogen or lower alkyl and n is an integer of 0 to 6; and polymerizing the monomers.

17 Claims, No Drawings

TRANSPARENT FIBROUS SHEETS

BACKGROUND OF THE INVENTION

1. Field of the Invention

The invention relates to methods of transparentizing fibrous sheets such as paper and to the transparentized fibrous products of the method.

2. Brief Description of the Prior Art

Transparent papers and like fibrous sheets are widely used in the packaging, printing and engineering fields. The purposes for using transparentized fibrous sheets such as paper vary from a need for reduced visual and reprint opacity to needs for chemical and physical resistance to degradation under certain conditions of use.

Engineering and reproduction applications for transparentized papers require certain physical and chemical characteristics such as good pencil and ink receptivity for tracing media, and a receptivity combined with frictional resistance which overcomes uneven penetration of coating solutions used in reprographic papers. When these papers are used in drafting, visual brightness is required and high UV translucency is necessary for making good reproductions. In practice, each grade of transparentized paper serves only a particular application. These papers are not interchangeable for each particular application. It is also desirable that a transparentized paper have good physical strength to resist handling, good permanence for record keeping, and chemical stability. Components applied to render the paper transparent should not migrate or volatilize, since that would result in a loss of transparency and contamination of interfiled documents.

Paper is a fibrous material composed of a plurality of discrete fibers disposed in a sheet configuration with many voids between the fibers. The disposed fibers scatter incident light. The physical process of rendering paper transparent comprises filling the voids between the fibers with a material that has a refractive index identical to or very close to that of the paper fibers. It should be noted that mineral fillers in papers affect the transparency because of their light absorption and light scattering properties and that papers without mineral fillers are preferred for transparentizing use.

Transparentizing paper is a widely established art and has been previously accomplished by impregnating the paper with mineral oils or waxes, polymeric thermoplastic resins such as polystyrenes, polybutenes, polypropenes, various rosin derivatives, and various polymers or copolymers of acrylics and styrene, with or without plasticizers. The application of such materials to the paper is done by either hot melt applications or by applying organic solvent solutions or aqueous emulsions to the paper. The processing equipment used for applying or treating fibrous material such as paper, varies with the type of application employed. For example, the transparentizing mixture may be applied by extrusion, tub, or roller applications and excess material may be removed by a doctoring off process using scrapers, wire, squeeze rollers, or size press. Where paper is employed for transparentizing, it sometimes is "wet packed" after treatment to improve the distribution of the transparentizing agents in the body of the paper and then after a certain time the "wet packed" paper is passed through a dryer to remove the solvent vehicle.

Where the transparentized paper is to be employed for drafting use, the transparentizing treatment may be followed by a surface application with resins and toothing agents such as particles of silica.

There are many disadvantages and problems associated with the prior art processes for transparentizing fibrous materials. High molecular weight resins would be desirable for transparentizing fibrous materials because of their physical strength, heat and water resistance, and absence of tendency of the resin to migrate within or out of the finished fibrous material. Such resins, however, can be applied to the fibrous material only with great difficulty since they tend to accumulate near or adjacent the surface of the fibrous material and when impregnation is accomplished the resin is generally unevenly distributed throughout the fibrous material. Thus, the translucency of the product made therefrom is low and is not uniform.

Low molecular weight liquid resins of low viscosity or mineral oils readily penetrate the fibrous material and produce a material of high translucency, but the finished surface would be soft and would not be pencil resistant. The surface would ghost upon erasure. Also, the transparentizing agents tend to migrate from the paper to interfiled documents lying adjacent thereto. Further, such low molecular weight resins or low viscosity materials are volatile and cannot be used where the transparentizing fibrous material is later subjected to elevated temperature processing equipment, such as xerography machines. The surface of such transparentized material is often tacky to the touch and therefore is undesirable.

Polymeric transparentizing agents which contain polaric and non-polaric groups in the chain are wetting agents and will distribute more readily through the fibrous material. However, such agents form a transparentized fibrous material which is too soft to the touch. Further, such transparentizing agents are mobile and easily leach out in water. They are not set in the fibrous material and would not be suitable, for example, for the later application of a diazo-sensitizing solution because such coating would be allowed to deeply penetrate the paper.

Other transparentizing processes comprise polycondensation of polyols with polyisocyanates in situ in the paper. The resulting polyurethane impregnated sheets, however, have insufficient translucency for tracing applications and upon aging produce yellow discoloration, even if so-called non-yellowing polyisocyanates are used. Further, transparentizing processes with polyurethane forming condensation reactions in-situ generally require the presence of substantial concentrations of non-polaric solvents like xylene to prevent accumulation of residual water in the fibrous material as well as hydroxy groups of cellulosic fiber to interfere with the condensation reaction. The condensation reaction actually takes place in a solution phase and as the polyurethane product resins are still dissolved in the solvent, it is in reality not an "in-situ" process, but the resin sediments out of solution and on to the fibrous material only after evaporation of the solvent at elevated temperature in a separate converting step. It can be well assumed that the polycondensation reaction still continues during the solvent evaporation at elevated temperature. The resin thus is not intimately bound to the fibrous material nor homogeneously distributed and gives a low transparentizing effect.

Prior art "in-situ" polymerized fibrous materials undergo heat, photo or electron beam polymerization immediately after impregnation in a continuing web pass. In such cases, extreme polymerization conditions are mandatory for economic reasons in order to shorten the reaction time. The polymerization can be considerted a spontaneous one. Thus, obtained transparentized sheets are more or less stratified materials and have a resin film on the surface which is detrimental to tracing applications, reduces receptivity for diazotype coating solutions, and is a cause for curl problems. If in such applications spontaneous polymerization is avoided through milder conditions, polymerization is incomplete and monomers or dimers remain in the composition. This makes the sheet useless for various applications. Spontaneous polymerization can also result in brittleness of the polymer, causing breaking of the resulting paper sheet, under the pressure of a hard pencil.

Improved transparentized fibrous sheets overcoming many of the above-described shortcomings have been obtained through the process disclosed in U.S. Pat. No. 4,271,227. In this process, monomers with 3 ethylenically unsaturated chain radicals bonded to one carbon atom are distributed within the fibrous sheet material and thermopolymerized in-situ.

We have now found that further improvements in the performance of transparentized fibrous sheets and more flexibility in the manufacturing process for such sheets are obtained by the in-situ polymerization of monomers of certain acrylic and methacrylic hydroxy alkylene or polyhydroxy alkylene esters etherified with hydrous dicyclopentene radicals.

The improvements over the prior art include higher translucency and an evener "look through" of the transparentized sheets. In the process of the invention, one may use a wider range of monomer concentrations without risk of blocking during the polymerization process. The monomers and polymers used in the process of the invention are also compatible with the transparentizing agents described in U.S. Pat. No. 4,271,227 and other conventional transparentizing resins such as polystyrenes, polybutenes, hydrogenated hydrocarbon resins and resin derivatives. Thus, the latter can be added in the process of the invention as modifiers or dilutents for certain applications.

We have also found that the transparentizing process of the present invention may be carried out advantageously by impregnation of a fibrous sheet with the monomers, winding up the impregnated material in a tight roll, at room temperature, and keeping the thus "wet packed" roll for a certain period of time at a temperature at which no polymerization takes place. Then, the temperature may be raised to initiate polymerization in a way like that of the process disclosed in U.S. Pat. No. 4,271,227.

We have also found that the polymerization of the monomer after impregnation of the fibrous sheet can be advantageously performed through photopolymerization techniques. The advantage is found in elimination of the need to heat the monomer impregnated material.

SUMMARY OF THE INVENTION

The invention comprises a transparent, non-stratified, water and alcohol resistant, resin reinforced fibrous sheet having as the resin component, polymerized monomer of the formula:

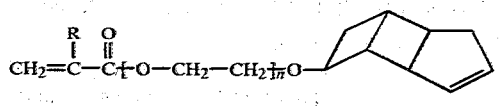

wherein R is selected from the group consisting of hydrogen and lower alkyl and n is an integer of from 0 to 6. Preferably, n is 1.

The term "non-stratified" as used herein means that the resin mass is not layered but is composed of polymer molecules which are uniformly distributed through the fibrous sheet.

The term "lower alkyl" as used herein means methyl, ethyl and propyl.

The invention also comprises a transparentized fibrous sheet, which comprises;

a plurality of discrete fibers which are disposed in a sheet configuration, at least a portion of said fibers being bonded together at cross-over points, forming voids between the fibers at non-crossover points; and a synthetic polymeric resin evenly dispersed in and filling voids, said resin having been formed in-situ in the voids by polymerization of a monomer selected from those of the formula (I) given above.

The invention also comprises the method of transparentizing fibrous sheets, which comprises;

providing a sheet of fibrous material for transparentizing and which comprises a plurality of discrete fibers which are disposed so that a least a portion of said fibers are bonded together at cross-over points, forming voids between the fibers at non-crossover points;

applying to a surface of the sheet a monomer of the formula (I) given above, or a mixture of such monomers with conventional transparentizing agents such as those described in U.S. Pat. No. 4,271,227 or with conventional transparentiziing resins such as polystyrene, polybutene and the like, in admixture with a polymerization catalyst;

evenly distributing the applied mixture of monomer and catalyst so as to fill voids in the sheet with the mixture of monomer and catalyst; and polymerizing the monomer in the voids.

Polymerization may be carried out by heating the monomer (thermopolymerization) or by irradiation (photopolymerization).

The invention also comprises the method of transparentizing fibrous sheets, which comprises;

providing a sheet of fibrous material for transparentizing and which comprises a plurality of discrete fibers which are disposed so that at least a portion of said fibers are bonded together at cross-over points, forming voids between the fibers at non-crossover points;

applying to a surface of the sheet a monomer of the formula (I) given above, or a mixture of such monomers with conventional transparentizing agents such as those described in U.S. Pat. No. 4,271,227 or with conventional transparentizing resins such as polystyrene, polybutene and the like in admixture with a photopolymerization catalyst;

evenly distributing the applied mixture of monomer and catalyst so as to fill voids in the sheet with the mixture of monomer and catalyst; and photo polymerizing the monomer in the voids.

DETAILED DESCRIPTION OF THE PREFERRED EMBODIMENTS OF THE INVENTION

The method of the invention will be described herein as it relates to the transparentizing of paper and more particularly as it relates to papers which comprise a plurality of discrete cellulosic fibers bonded together at cross-over points to make up a sheet of paper. However, it should be appreciated that the method of the invention is not limited to the transparentizing of such representative materials.

The method of the invention for transparentizing fibrous material may be employed on a wide variety of paper bases such as paper prepared from rags, chemical pulp or non-woven fibrous material and like materials provided the resulting paper is not contaminated with substances which might inhibit polymerization of the monomers of formula (I) given above.

The paper base provided for transparentizing by the method of the invention may be a non-sized saturating base with or without surface size, or beater sized sheets with or without surface or internal size, as long as the size is permeable to the monomer or its solution in an appropriate solvent. The stronger the base paper is sized, the more attention will have to be given to the step of evenly distributing the monomer (I) in the base paper, as will be described in detail hereinafter. Preferably, the base paper will be free of mineral fillers, since they add to opacity of the paper.

According to the method of the invention, there is applied to a surface of the provided paper base or like fibrous sheet, a monomer of the formula (I) given above, advantageously in admixture with a polymerization catalyst.

The polymerization catalyst additive may be used in an effective amount to polymerize the monomers (I). In general, an effective amount is an amount ranging from 0.1 up to about 10 percent, preferably 2 percent of the weight of monomer (I). Catalysts for thermopolymerization include organic peroxides, metal driers, organic and inorganic acids, and the like, and mixtures thereof. Specific examples of catalysts include phosphoric acid; hydrochloric acid; sulfonic acids such as p-toluene sulfonic acid; lactic acid; oxalic acid; maleic, fumaric, phthalic, succinic and the like acids and anhydrides; oxygen; ozone, peroxides, such as hydrogen peroxide, acetyl peroxide, benzoylperoxide, and lauroyl peroxide; perborates; percarbonates; metal driers, such as the naphthenates, linoleates, resinates, octoates, acetates, borates, oxalates and the like, of cobalt, manganese, cerium and lead; amines; amine salts, such as the triethanolamine salt of sulfonic acid and the like and mixtures thereof. Preferred as the catalyst for thermopolymerization is a peroxide catalyst such as benzoylperoxides.

Catalysts for photopolymerization include benzophenone, xanthone, benzoin butyl ether, benzoin methyl ether, alpha, alpha-dialkoxyacetophenones and the like. Additives for photoinitiation of photopolymerization are also useful for the polymerization process of the invention. Such additives include compounds containing tertiary nitrogen atoms such as N-methyl morpholine, triethanolamine N-methyldiethanolamine and the like. The photoiniation additives are generally used at concentrations approximately equal to the concentration of the catalyst employed.

The catalysts and photoinitiators may be mixed with the monomers of formula (I), employing conventional techniques and mixing apparatus.

Monomer compounds within the scope of the formula (I) given above are generally known as are methods of their preparation. In general, the compounds (I) may be prepared by esterification of an appropriate ethylenically unsaturated acid such as acrylic or methacrylic acid with an appropriate alcohol of the formula:

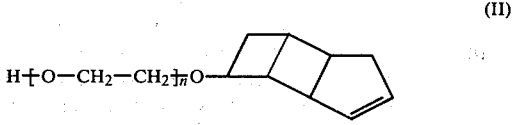

(II)

wherein n is an defined above. Those compounds of the formula (I) wherein $n=1$ are commerically available.

The compounds of the formula (I) are free radical, polymerizable, ethylenically bis-unsaturated monomers or oligomers thereof which are generally identified as the acrylic acid esters or methacrylic acid esters of hydroxy ethylene oxy-or polyethylene oxy-dicyclopentenes and mixtures thereof.

The molecular structure of the monomers (I), with one ethylenical unsaturation in the chain and a second ethylenical unsaturation in one ring structure seems to be responsible for the ease of penetration of the monomers into the fibrous sheet, for the compatibility with other transparentizing resins and for the physical strength conveyed to the fibrous sheet by the method of the invention. When monomers with one or two ethylenical unsaturations in the chains only are used, the transparentized sheets obtained tend to be more brittle.

The compatibility of the monomers (I) with other transparentizing systems such as those of U.S. Pat. No. 4,271,227, or polystyrene or polybutene, allows considerable flexibility in the processing parameters and in the achievable performances of the transparentized sheet. It has been found that the addition of polybutene for instance to the monomer (I) allows a wider latitude of polymerization conditions as well as giving greater pliability to the transparentized sheet. It is believed in this case that the polybutene decreases the inhibiting effect of oxygen on the polymerization of the monomers (I).

The cyclic unsaturated and the acrylic or methacrylic unsaturation found in the compounds of the formula (I) allows for their copolymerization and thus generates cross-linked polymers. This results in solvent and water resistance of the transparentized material.

The mixtures of compounds of the formula (I) and the catalysts and initiators may be applied to a surface of the sheet for transparentizing by any convenient and conventional technique employing conventional apparatus. Advantageously, the monomer mixture is applied to the fibrous sheet at a ratio of between 5 and 20 parts of monomer to 100 parts of fibrous sheet by weight. Depending on the equipment used for the application of the mixture to the fibrous sheet (which can vary from dipping or kiss roller applicators with mechanical scraper bars or squeegee rollers to extrusion coating or other metering devices) the monomer-catalyst mixture may be applied with or without appropriate solvents. The need for a solvent is not necessary to the method of this invention, but serves only as a means to control the amount of monomer or monomers (I) applied to the fibrous material and thus is a function of the application equipment and may vary from 0% to 200% based on monomer (I) content. Innocuous volatile solvents, such as isopropanol which do not cause harm to the environment are preferred. The solvent, if any is used, may be removed from the to sheet by evaporation, immediately after the application station and prior to the rewinding of the sheet for "wet packing" as will be described hereinafter. If the solvent is not removed prior to wet packing and polymerization, no harm is done since the polymerized resin is insoluble in the solvent for the monomers and thus can intimately deposit on to the fiber surface, while it is formed during polymerization, without inhibition by the solvent for the monomer.

Advantageous to the process of the invention is an even distribution of the applied mixture of monomer (I) and catalyst so as to fill voids in the paper sheet. We have found that this step in the process of the invention is advantageously accomplished by "wet packing" of the paper sheet following application of the monomer-catalyst mixture. Wet-packing is accomplished by winding the web of paper in a roll under tension. Dispersion of the monomer mixture proceeds in the "wet packed" roll with the tight winding of the roll promoting even distribution of the monomer and catalyst, eliminating surface tension effects. The even distribution of the monomer within the fibrous sheet provides for non-stratified resin-fiber composition. The wet-packed roll should be allowed to stand at room temperature (or at least at a temperature below the thermopolymerization temperature of the monomer-catalyst mixture, for example at a temperature of between 15°–30° C.) for a period of time sufficient for even distribution of the monomer-catalyst mixture in the voids of the fibrous sheet. It will be appreciated that the length of time will vary depending on a number of factors such as the viscosity of the applied mixture, the nature of the base paper and its sizing, if any, the tension employed in wet packing, etc. Optimum time periods may be determined for given processes by trial and error techniques. In general, we have found that wet-packing for about 24 hours at room temperatures is sufficient to obtain even distribution of the monomer (I) and catalyst mixture in most instances.

Following the even distribution step described above, monomer (I) may be polymerized in-situ in the fibrous sheet. In one embodiment of the invention this is carried out by exposing the sheet to a temperature sufficient to activate the catalyst and initiate polymerization of the monomer of formula (I). For the polymerization step of the preferred process, the "wet packed" roll is placed in a curing oven, preferably at a moderate temperature to generate a low reaction speed rate for the polymerization, resulting in a resin reinforced transparent fibrous sheet with optimum qualities. The desirable slow heat polymerization reaction requires only oven space and does not reduce production capacity by a need for more expensive equipment such as a moving web dryer.

It has been found that because of the low vapor pressure of monomers (I) it is possible to subject the transparentized fibrous sheet to elevated temperatures, in the range of 90° C. to 110° C. in a drying oven, for a short period of time, and to obtain complete polymerization without undue generation of smog in the oven environment. Based on this observation, it would also be possible to polymerize a moving web of such transparentized fibrous sheet in a continuous fashion in for example a coating and drying machine. At more elevated temperatures the vapor pressure of the monomers is high enough to generate at least some formation of smog in the oven environment and exhaust air purification would be necessary for practical applications. This adds to the cost of a given process. The process of the present invention can proceed with polymerization at much lower temperatures, with lower vapor pressure of the monomers. In the tight enclosure of the wound roll of the fibrous sheet, practically no vapors and no smog are released into the environment.

Following polymerization, either in the moving web, or in the "wet-packed" roll which is generally complete within 12 to 72 hours, the wound roll may be stored for future use or it may be immediately unwound and converted (cut) to any desired size for use.

In another embodiment of the invention the polymerization is carried out by radiation curing. The "wet-packed" roll is unwound and the impregnated web passes under a UV light source which initiates the polymerization reaction. An assembly of high pressure mercury vapor tubes are useful for speedy polymerization and the resin reinforced transparent fibrous sheet is wound up and ready for usage.

The following examples and preparations describe the manner and process of making and using the invention and set forth the best mode contemplated by the inventors for carrying out the invention but are not to be construed as limiting. All parts are by weight unless otherwise specified.

EXAMPLE 1

A transparentizer solution was prepared by admixture of the following materials:

| | |
|---|---|
| dicyclopentenyloxyethyl methacrylate* | 160 kg. |
| isopropyl alcohol | 160 liters |
| benzoyl peroxide | 3 kg |

*QM-657, Rohm and Haas Co., Philadelphia, Pennsylvania.

On a paper coating machine running at a speed of 5000 yards per hour, a roll of 6000 yards of a natural, 100% rag paper with a basis weight of 54 g/m$^2$, with internal and surface sizing was roller coated with the above solution. The surplus of transparentizer solution was doctored (with the aid of a doctor knife) from the impregnated base material to leave a surface free of any excess solution. The paper was then passed through the drying tunnel of the machine where a current of warm air at a temperature of 60° C. to 110° C. evaporates the isopropyl alcohol. The paper coming out of the drier was wet to the touch, but not tacky. It was wound up and kept wet packed for 24 hours at room temperature. Subsequently, the wet packed roll was placed in an oven heated to 70° C. to 75° C. and kept at that temperature for 24 hours. The roll was then rewound for evaluation and sample sheets cut out from the outside, the center and the inside of the roll. All three samples had exactly the same properties and measurements and all three gave the same results.

The paper thus obtained increased its basis weight to 62 g/m$^2$. It had an opacity of 26%, measured on a Bausch & Lomb opacimeter. It was highly and very evenly translucent to visible and ultra violet light. It exhibited excellent dimensional stability when compared to transparentized papers using different systems, and greater permanency. When dipped in water, acetone, alcohol or toluene, and redried, no change in translucency was apparent. Its hard surface on either side was receptive to tracing points of the range from No. 2 through No. 8H (from softest to hardest) and also to different black inks. The lines drawn were easily erased leaving absolutely no "ghost" image. When used as a tracing for making reprints on a diazotype paper, the printing speed was twice as fast than as if the paper had not been transparentized.

The transparentized sheet obtained in this example was used to prepare an intermediate diazotype reproduction paper in the following manner.

The roll of paper was placed on a diazotype coating machine with three air knife coating stations and precoated on the first coating station with a preparation of:

| | |
|---|---|
| water | 1000 parts |
| ammonia | 14 parts |
| colloidal silica | 20 parts |
| non-colloidal silica | 50 parts |
| 8% anitfoam dispersion | 2 parts |
| polyvinyl acetate, 50% dispersion in water | 80 parts |
| wax emulsion | 12 parts | and dried thereafter and then sensitized in the second coating station with a preparation of:

| | |
|---|---|
| water | 1000 parts |
| citric acid | 40 parts |
| 1-diazo 4-N,N diethyl-amino benzene chloride ½ zinc chloride (Diazo #49, Andrews Paper & Chemical Co., Port Washington, New York) | 40 parts |
| isopropyl alcohol | 10 parts |
| 2,5 dimethyl-4-morpho-lino methylphenol (Coupler #603, Andrews Paper & Chemical Co., Port Washington, supra) | 40 parts |
| 2-resorcyclic acid (Coupler #320, Andrews Paper & Chemical Co., supra) | 10 parts |
| thiourea | 20 parts |
| colloidal silica | 20 parts |
| polyvinylacetate (50% aqueous dispersion) | 50 parts |
| zinc chloride | 25 parts | and dried thereafter and then backcoated in the third coating station with a preparation of:

| | |
|---|---|
| water | 1000 parts |
| citric acid | 10 parts |
| zinc chloride | 30 parts |
| polyvinylacetate (50% aqueous dispersion) | 40 parts | and dried to a residual moisture of 3.5%. The thus obtained intermediate diazotype paper was exposed behind an original tracing in a diazotype printing machine and developed with ammonia vapors. A high quality intermediate diazotype, with deep brown print line on a clear evenly translucent background, without objectionable curl and with good line reproducibility was obtained. The reprint speed to produce opaque diazotype copies exceeds by 35% the reprint speed of a prepared diazotype intermediate, which was sensitized with the same diazotype coating solution, but transparentized with a conventional solution of alpha methylstyrene polymer in toluene, and the print background appears much evener.

EXAMPLE 2

A transparentizer solution was prepared by a mixture of the following materials:

| | |
|---|---|
| dicyclopentenyloxyethyl acrylate* | 160 kg. |
| isopropyl alcohol | 160 liters |
| benzoyl peroxide | 3 kg. |

*QM-672, Rohm and Haas, Philadelphia, Pennsylvania.

The procedure of Example 1 was repeated except for the use of the above transparentizer solution instead of the one from Example 1.

The overall results obtained were identical to those of Example 1, supra.

EXAMPLE 3

A transparentizer solution was prepared by mixing the following materials:

| | |
|---|---|
| dicyclopentenyloxyethyl methacrylate | 75 kg |
| trimethylolpropane trimethacrylate | 75 kg |
| ethyl alcohol | 150 liters |
| benzoyl peroxide | 3 kg |

On a paper impregnating machine, a calendered 100% rag base paper of 45 g/m$^2$ with internal sizing and surface sizing, traveling at a speed of 4000 yards per hour, was dipped into the above solution and immediately thereafter passed through a pair of squeeze rollers to eliminate any excess solution from the surface. The paper was then processed through the machine in a similar fashion to that of Example 1. The transparentized sheet obtained in this example when used as a tracing for making reprints on an opaque diazotype paper showed an 85% improvement in printing speed over the paper that had not been transparentized. Intermediate diazotype reproduction papers were prepared, using the transparentized sheet in this example through precoating and sensitizing or direct sensitizing as described in U.S. Pat. Nos. 2,516,931; 2,950,852 and 3,330,662. High quality intermediate with dense actinic lines and high reprint translucency were obtained.

EXAMPLE 5

The transparentizer solution of Example 1, supra was applied to a white calendered cotton linters paper of 54 g/m$^2$ basis weight with internal sizing and surface sizing and the paper was processed through the machine in the manner described in Example 1, supra.

The transparentized paper obtained was not sensitized but tested as a drafting vellum against the same paper impregnated with conventional transparentizing solutions of (a) styrene (M.W. 800) or (b) polybutene resin (M.W. 1260).

The results are shown in the following table:

|  | Example 3 | (a) Styrene Polymer | (b) Polybutene |
| --- | --- | --- | --- |
| pencil lead acceptance | excellent | good | good |
| pencil wear | good | good | good |
| pencil erasure: | | | |
| HB (soft) | excellent no ghost | fair slight ghost | poor severe ghost |
| 8H (hard) | excellent no ghost- no craze | good no ghost- some craze | good slight ghost |
| India ink acceptance | excellent no ink spread | good no ink spread | fair some ink spread |
| India ink erasure | excellent | fair | poor |

EXAMPLE 5

A transparentizing solution was prepared by mixing the following materials:

| | |
| --- | --- |
| dicyclopentenyloxyethyl methacrylate | 1000 g |
| polystyrene M.W. 800 | 600 g |
| xylene | 750 cc |
| isopropanol | 750 cc |
| benzoyl peroxide | 50 g |

On a paper impregnating machine, the above solution was applied to the same base paper and in the same manner as in Example 3, supra.

The paper thus obtained had increased its basis weight by 14% and had an opacity of 28%, measured on a Bausch & Lomb opacimeter.

This paper was used to prepare a lacquered diazotype intermediate material on a solvent diazotype coating machine by applying, in a manner well-known in the art, the following solution:

| | |
| --- | --- |
| isopropanol | 720 parts |
| ethylene glycol monoethylether | 960 parts |
| methylethyl ketone | 720 parts |
| thiourea | 12 parts |
| sulfosalicylic acid | 16 parts |
| 4,6 dichlororesorcinol (Coupler #346, Andrews Paper & Chemical Co., supra) | 45 parts |
| 1-diazo 4-N,N—diethylamino benzene borofluoride (Diazo #69, Andrews Paper & Chemical Co., supra) | 40 parts |
| cellulose acetate butyrate | 250 parts | and drying to eliminate the solvents. The thus obtained lacquered diazotype intermediate was exposed behind an original tracing in a diazotype printing machine and developed with ammonia vapors. Very dense brown print lines on a clear, evenly translucent background and a high gloss surface were obtained. When compared to a conventional lacquered diazotype intermediate made by applying the same sensitizing solution in an identical way to a wood pulp natural transparent paper (also called "calque"), the material of this example shows the following advantages:

(a) Freedom of curl under varied atmospheric conditions, while the natural tracing paper is sensitive to moisture and curls in humid atmosphere.

(b) Unaffected by water, while the natural tracing paper is severaly distorted by contact with water.

(c) Improved shelf life caused by the inertness of the base. The natural tracing paper interacts with the sensitizer to reduce shelf life.

(d) Improved tear and fold strength.

EXAMPLE 6

A transparentizer solution was prepared by admixture of the following materials:

| | |
| --- | --- |
| dicyclopentenyloxyethyl acrylate | 100 kg |
| polybutene M.W. 1260 | 50 kg |
| isopropanol | 75 liters |
| benzoyl peroxide | 2 kg |

On a paper impregnating machine, a mill roll of 50 m/g² bleached sulfite base paper with internal sizing and surface sizing, traveling at a speed of 2000 yards per hour was dipped into the above solution. The surplus of transparentizer solution was doctored with the aid of two doctor knives, one on each side of the paper, to leave a surface free of any excess solution. The paper was then transported through the machine at room temperature and immediately thereafter wound up. It was kept wet packed for 48 hours then placed in an oven heated to 75° C. and kept at this temperature for 36 hours. The paper thus obtained exhibited a high and even translucency. It was used to prepare an intermediate diazotype reproduction paper in the following manner.

The roll of paper was placed on a diazotype coating machine with two air knife coating stations and coated on the first coating station with a preparation of:

| | |
| --- | --- |
| water | 1000 parts |
| citric acid | 40 parts |
| sulfosalicylic acid | 20 parts |
| 1-diazo-3-methyl-4-pyrrolidino benzene chloride, ½ zinc chloride (Diazo #88, Andrews Paper & Chemical Co., Port Washington, N.Y.) | 30 parts |
| 1-diazo-4-N,N dimethylamino benzene chloride, ½ zinc chloride (Diazo #48, Andrews Paper & Chemical Co., supra) | 30 parts |
| thiourea | 15 parts |
| dipropylene glycol | 50 parts |
| 1,10-dicyanoacet-triethylene tetramine HCl salt (Coupler #690, Andrews Paper & Chemical Co., supra) | 50 parts |
| 2,3 dihydroxy naphthlene-6-sulfonic acid sodium salt (Coupler #111, Andrews Paper & Chemical Co., supra) | 10 parts |
| aluminum sulfate | 5 parts |
| isopropyl alcohol | 100 parts |
| zinc chloride | 100 parts |
| rice starch | 100 parts |
| polyvinyl acetate (50% aqueous dispersion) | 100 parts | and dried thereafter and then backcoated in the second coating station with a preparation of:

| | |
| --- | --- |
| water | 1000 parts |
| citric acid | 10 parts |

-continued

| | |
|---|---|
| zinc chloride | 50 parts | and dried to a residual moisture of 3.5%. The thus obtained intermediate diazotype paper was exposed behind an original tracing in a diazotype printing machine and developed with amminia vapors. A highly translucent intermediate diazotype with black print lines on a clear background was obtained. The reprint speed to produce opaque diazotype copies is 30% higher than the reprint speed of the same base paper, transparentized with a polybutene solution and sensitized with the same diazotype preparation in the same manner.

EXAMPLE 7

A transparentizing solution was prepared by mixing the following ingredients:

| | |
|---|---|
| dicyclopentenyloxyethyl methacrylate | 1000 g |
| isopropanol | 1000 cc |
| benzophenon | 2 g |
| triethanolamine | 2 g |

The solution was applied to 24"×8" strips of 100% natural rag paper of a basis weight of 54 g/m², with a wire bar #32. The paper was rolled up and kept in a closed container for 30 minutes. After that time the transparentizing solution had evenly distributed through the sheet filling all the voids and the sheet appeared evenly translucent.

The thus impregnated sheet was then attached to a slowly rotating cylinder of 8" diameter. A medium pressure mercury vapor ultra violet lamp with an energy output of 150 watt per inch was placed at a distance of 3 inches from the cylinder surface.

After an exposure time of 60 seconds and a cylinder rotation of 30 RPM the sheet was removed.

The sheet had a Bausch and Lomb opacity of 26% and showed a very even translucency all across.

The sheet did not lose translucency after dipping in isopropanol and toluene and redrying.

Pencil take and erasure were excellent.

EXAMPLE 8

The wet packed roll of Example 1, after being kept for 24 hours at room temperature was then passed through the drying tunnel of the machine, at a web speed of 30 yards per minute, where a current of hot air at 110° C. caused the polymerization of the monomer to take place. The paper coming out of the dryer was dry to the touch, odorless and evenly translucent to visible and UV light. It showed the same properties as the paper produced in Example 1, supra.

What is claimed:

1. A transparent, non-stratified, water and alcohol resistant, resin reinforced cellulosic fibrous sheet having as the resin component, polymerized monomer of the formula:

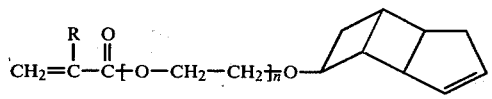
(I)

wherein R is selected from the group consisting of hydrogen and lower alkyl and n is an integer of from 0 to 6.

2. The sheet of claim 1 wherein n is 1.
3. The sheet of claim 2 wherein R is hydrogen.
4. The sheet of claim 2 wherein R is methyl.
5. A transparent, non-stratified, water and alcohol resistant, resin reinforced cellulosic fibrous sheet having polymerized resin components, polymerized from a mixture of monomers of the formula:

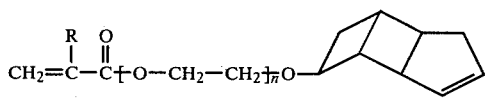
(I)

wherein R is selected from the group consisting of hydrogen and lower alkyl and n is an integer of from 0 to 6; and $$\begin{array}{l} H_2C-O-CO-CR^1=CH_2 \\ HC-O-CO-Cr^1=CH_2 \\ H_2C-O-CO-CR^1=CH_2 \end{array}$$ (II)

wherein $R^1$ is selected from the group consisting of hydrogen and lower alkyl.

6. A transparent, non-stratified, water and alcohol resistant, resin reinforced cellulosic fibrous sheet having as the resin component, polymerized monomer of the formula:

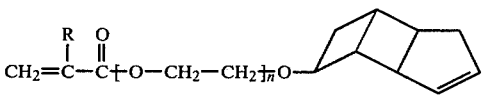
(I)

wherein R is selected from the group consisting of hydrogen and lower alkyl and n is an integer of from 0 to 6; in combination with polystyrenes, polybutenes and hydrogenated hydrocarbon resins or their mixtures.

7. The method of transparentizing fibrous sheets, which comprises;
providing a sheet of fibrous material for transparentizing and which comprises a plurality of discrete fibers which are disposed so that at least a portion of said fibers are bonded together at cross-over points, forming voids between the fibers at non-crossover points;
applying to a surface of the sheet a monomer of the formula:

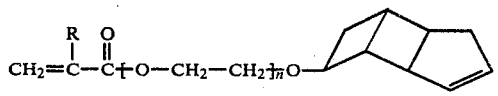

wherein R is selected from the group consisting of hydrogen and lower alkyl, and n is an integer of a 0 to 6; in admixture with a polymerization catalyst; evenly distributing the applied mixture of monomer and catalyst so as to fill voids in the sheet with the mixture of monomer and catalyst; and polymerizing the monomer in the voids.

8. The method of claim 7 wherein said sheet is a rag paper.

9. The method of claim 7 wherein said sheet is a paper made from chemically purified wood pulp.

10. The method of claim 7 wherein said sheet is a paper with internal and surface sizing.

11. The method of claim 7 wherein n is 1.

12. The method of claim 11 wherein R is hydrogen.

13. The method of claim 11 wherein R is methyl.

14. The method of claim 7 wherein polymerization is carried out by heating and a thermopolymerization catayst is used.

15. The method of claim 7 wherein polymerization is photopolymerization and the catalyst is a photopolymerization catalyst.

16. The method of claim 7 wherein distributing is by wet-packing the applied to sheet in a roll under tension.

17. The method of claim 16 wherein the wet packed roll is maintained for 24 hours prior to thermopolymerization.

* * * * *

UNITED STATES PATENT AND TRADEMARK OFFICE
CERTIFICATE OF CORRECTION

PATENT NO. : 4,416,950  
DATED : November 22, 1983  
INVENTOR(S) : Peter Muller et al Page 1 of 2

It is certified that error appears in the above—identified patent and that said Letters Patent is hereby corrected as shown below:

Column 4, line 5; at the end of the formula; 

should read -- 

Column 6, line 15; at the end of the formula; 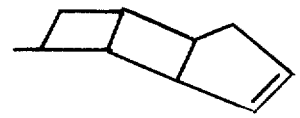

should read -- 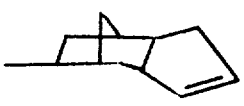

Column 14, line 5; at the end of the formula; 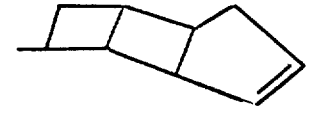

should read -- 

Column 14, line 25; at the end of the formula; 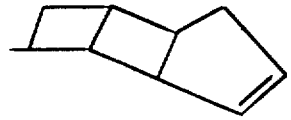

should read -- 

UNITED STATES PATENT AND TRADEMARK OFFICE
CERTIFICATE OF CORRECTION

PATENT NO. : 4,416,950

DATED : November 22, 1983

INVENTOR(S) : Peter Muller et al

It is certified that error appears in the above—identified patent and that said Letters Patent is hereby corrected as shown below:

Column 14, line 50; at the end of the formula; 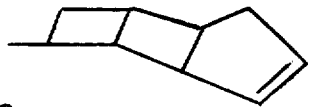

should read -- 

Columns 14, 15 and 16; Claims 7-17 should be deleted.

On the title page "17 Claims" should read --6 Claims--.

Signed and Sealed this

Tenth Day of July 1984

[SEAL]

Attest:

GERALD J. MOSSINGHOFF

Attesting Officer

Commissioner of Patents and Trademarks